United States Patent
Baudassé et al.

(10) Patent No.: US 9,796,485 B2
(45) Date of Patent: Oct. 24, 2017

(54) RETRACTABLE DEPLOYABLE STRUCTURE USING A TAPE SPRING

(71) Applicant: THALES, Courbevoie (FR)

(72) Inventors: Yannick Baudassé, Cannes la Bocca (FR); Stéphane Vézain, Cannes la Bocca (FR); Didier Stanek, Cannes la Bocca (FR); François Guinot, Cannes la Bocca (FR)

(73) Assignee: Thales, Courbevoie (FR)

( * ) Notice: Subject to any disclaimer, the term of this patent is extended or adjusted under 35 U.S.C. 154(b) by 71 days.

(21) Appl. No.: 14/945,273

(22) Filed: Nov. 18, 2015

(65) Prior Publication Data

US 2016/0144984 A1    May 26, 2016

(30) Foreign Application Priority Data

Nov. 21, 2014  (FR) .................................... 14 02620

(51) Int. Cl.
| | | |
|---|---|---|
| *B64G 1/22* | (2006.01) | |
| *B65H 75/36* | (2006.01) | |
| *B64G 1/44* | (2006.01) | |
| *B64G 1/50* | (2006.01) | |
| *B64G 1/66* | (2006.01) | |

(52) U.S. Cl.
CPC ............ *B64G 1/222* (2013.01); *B65H 75/364* (2013.01); *B64G 1/44* (2013.01); *B64G 1/503* (2013.01); *B64G 1/66* (2013.01)

(58) Field of Classification Search
CPC ........ B64G 1/222; B64G 1/44; B65H 75/364; B65H 75/34; H01Q 1/087; E04C 3/005; E04H 12/18
See application file for complete search history.

(56) References Cited

U.S. PATENT DOCUMENTS

| | | | | |
|---|---|---|---|---|
| 3,243,132 A | * | 3/1966 | Taylor ..................... | B64G 9/00 242/390.3 |
| 3,434,254 A | * | 3/1969 | Rubin ..................... | B64G 9/00 138/119 |
| 3,589,632 A | * | 6/1971 | Rew ...................... | B21C 47/003 188/82.84 |
| 4,117,495 A | * | 9/1978 | Hochstein .............. | H01Q 1/087 343/723 |

(Continued)

FOREIGN PATENT DOCUMENTS

| | | |
|---|---|---|
| FR | 2 868 094 A1 | 9/2005 |
| FR | 2 998 876 A1 | 6/2014 |
| GB | 2 298 182 A | 8/1996 |

*Primary Examiner* — Richard G Davis
(74) *Attorney, Agent, or Firm* — Baker Hostetler LLP

(57) ABSTRACT

A deployable structure comprises: a mount comprising a first point and a second point opposite and a third point, a storage reel able to rotate about an axis Z, a tape spring able to switch from a configuration in which it is wound about the axis Z in the storage reel into a configuration in which it is deployed along an axis X substantially perpendicular to the axis Z, the first and second points forming a double support with the tape spring to keep the tape spring in the deployed configuration. The third point is able to form a simple support with the tape spring, the storage reel is able to move with respect to the third point and the storage reel is pressed against the third point to guide the deployment of the tape spring.

9 Claims, 6 Drawing Sheets

(56) References Cited

U.S. PATENT DOCUMENTS

| | | | | |
|---|---|---|---|---|
| 4,961,370 A | * | 10/1990 | Sawyer | F41A 9/42 |
| | | | | 52/108 |
| 7,856,735 B2 | | 12/2010 | Allezy et al. | |
| 2014/0151485 A1 | * | 6/2014 | Baudasse | B64G 1/222 |
| | | | | 242/375 |

* cited by examiner

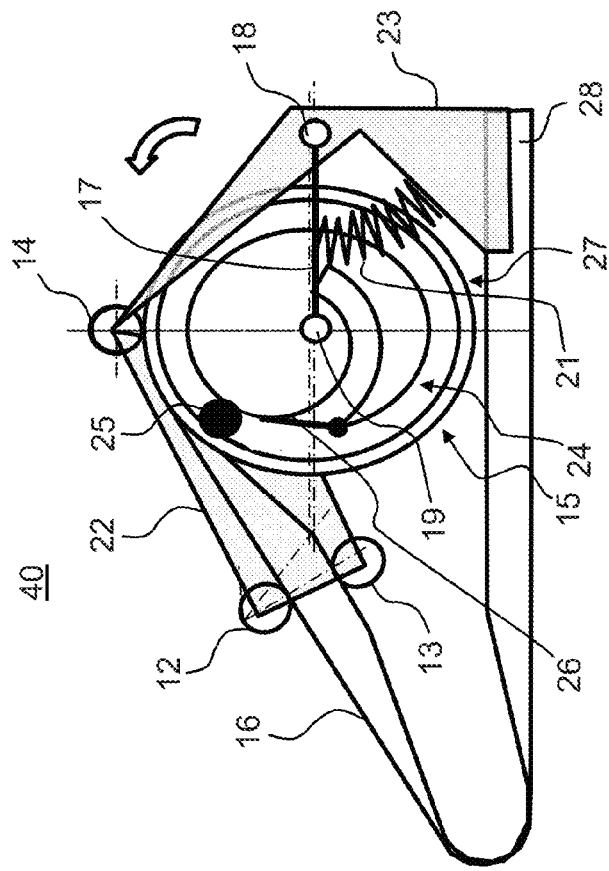
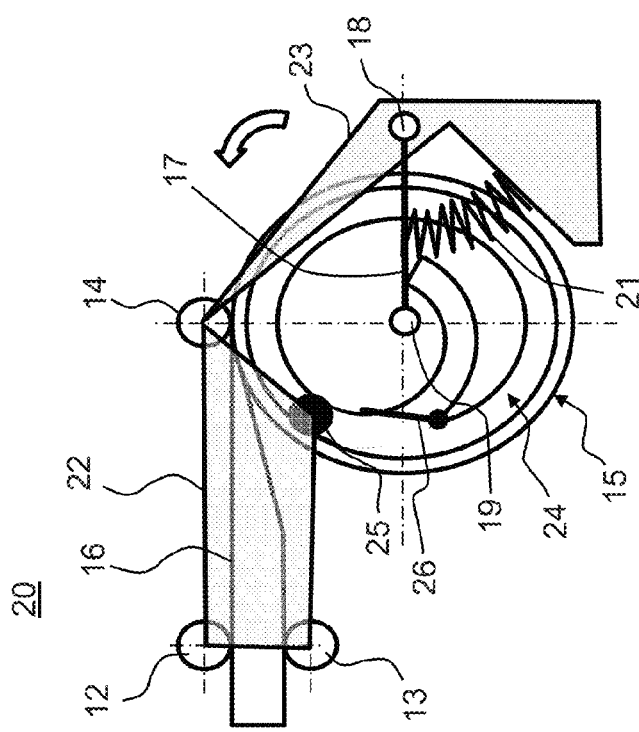

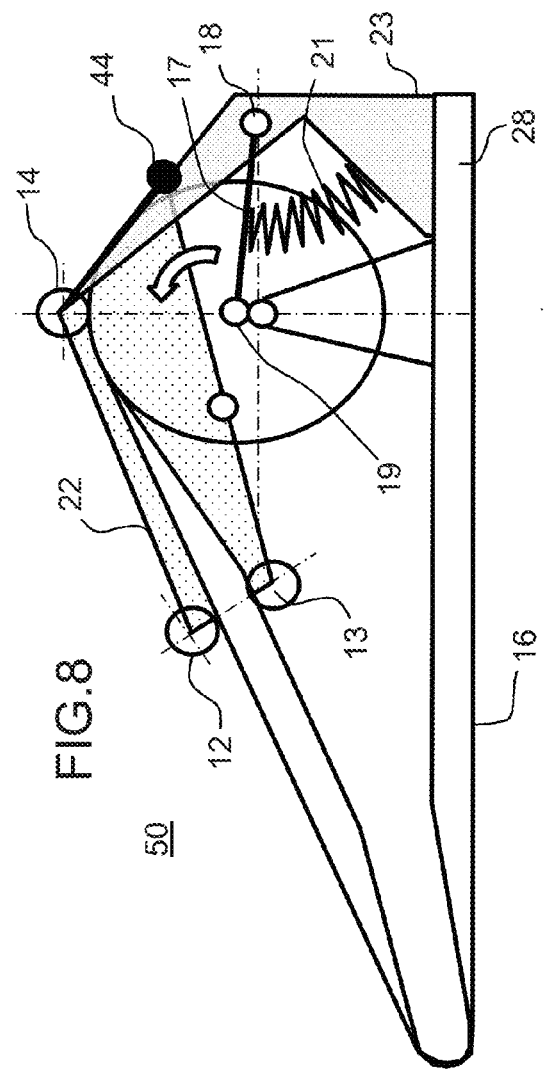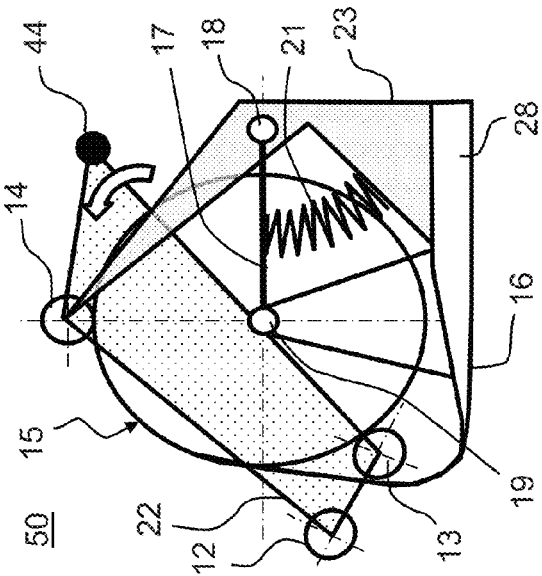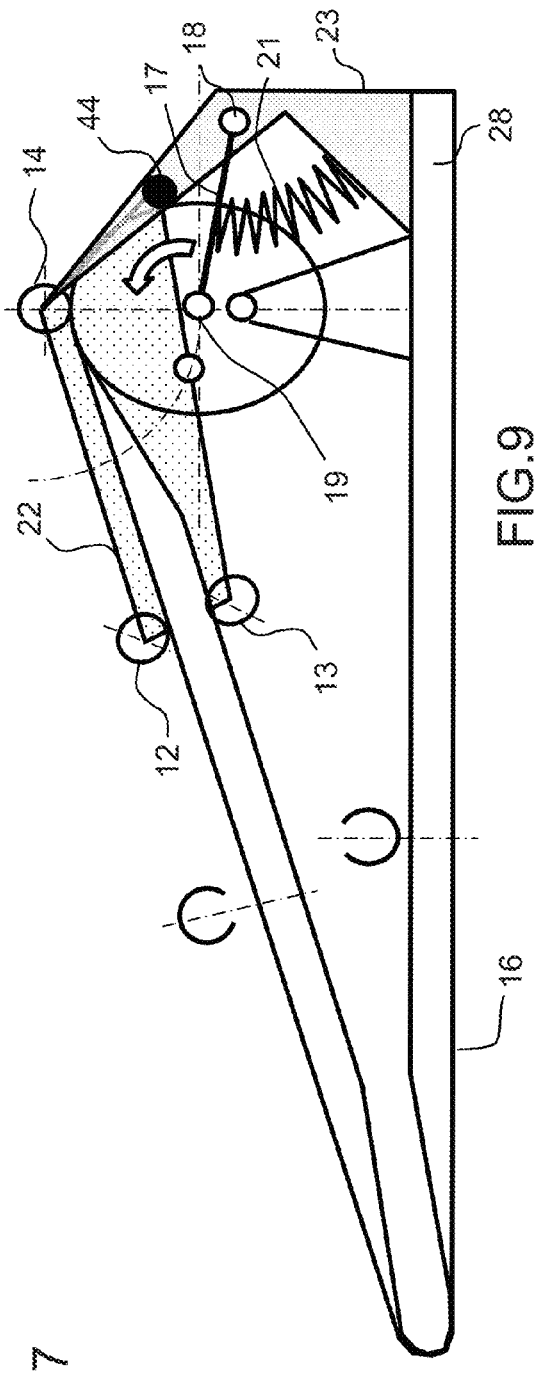

RETRACTABLE DEPLOYABLE STRUCTURE USING A TAPE SPRING

CROSS-REFERENCE TO RELATED APPLICATION

This application claims priority to foreign French patent application No. FR 1402620, filed on Nov. 21, 2014, the disclosure of which is incorporated by reference in its entirety.

FIELD OF THE INVENTION

The present invention relates to a retractable deployable tape-spring structure for a flexible structure that can be rolled up and deployed. It notably applies to the field of space equipment that needs to be deployed in orbit and more particularly to space equipment for satellites, such as antennas, solar generators, heat shields, baffles or telescopes.

BACKGROUND

Structures that can be deployed in space, for example of the solar generator type, are generally made up of rigid panels articulated together, these panels, when in the stored position, being stacked on top of one another. These structures have the advantage of kinematics that are well controlled but have the disadvantage of high specific mass and high inertia. Further, when in the stored position, the rigid structures occupy a significant amount of space under the fairing of a launcher. Because the space under the fairing of a launcher allocated to the deployable structures is limited, it is important to reduce the amount of space required by these deployable structures when they are in the stored position in order to optimize the area they can occupy when deployed.

There are deployable flexible planar structures that comprise a flexible sheeting and tape springs which are fixed to one and the same plane of the sheeting. In the stored position, the sheeting and the tape springs are wound around a mandrill. The flexible planar structure is deployed autonomously by the spontaneous unwinding of the tape springs when the mandrill is free to rotate.

Indeed, tape springs are known in the field of space as being flexible tapes with a cross section in the form of a circular arc, the radius of curvature of which is convex on a first face and concave on a second face, these tapes being able to pass from the wound state to the unwound state essentially as a result of their own stored elastic energy. There are different types of tape each of which has its own properties. Monostable tapes have a deployed natural position and need retention to keep them in a stored position. Monostable tape springs therefore have a natural tendency to deploy in order to revert to their unwound state. The deployment of monostable tapes is often haphazard and uncontrolled. Bistable tapes have two natural positions (stored position and deployed position) and do not require retention to keep them in the stored position when the cross section is completely flattened. Their deployment is linear and controlled. However, in all cases, when deployment is triggered deployment may be violent and jerky, which means to say that the entire tape spring may have a tendency to straighten out all at once, over the entire length, presenting a risk of damaging surrounding elements or elements fixed to the tape spring such as a flexible membrane, an instrument, an antenna, etc. Conventional tape springs may thus exhibit difficulties in terms of control over their deployment. In order to regulate the speed at which this type of structure deploys, there are a number of methods that can be used. Mention may for example be made of regulation using a geared electric motor unit as described in patent application FR12/03300 or thermal regulation using hybrid tape springs as described in patents FR 0803986 and U.S. Pat. No. 7,856,735.

Furthermore, tape springs do not have the same stiffness depending on the axis of strain. A force F applied to the convex face of the tape spring will have a tendency to cause the tape spring to flex whereas the same force applied to the concave face will have no effect, thereby presenting a problem of instability of the flexible structure in its deployed state. In order to address this problem of stability in the deployed state, it is therefore necessary to keep the tape spring in the deployed position using an additional retaining device or to over-engineer the tape spring in order to ensure that it remains stable under the forces of orbiting, whatever the direction in which these are applied.

Thus, in the stored configuration, the tape spring needs to be as compact as possible, namely to have the smallest possible radius of winding. This parameter is set by the physical characteristics of the tape; generally, the radius of winding is substantially equal to the radius of curvature of the tape. In the case of a composite tape, this can be altered by changing the layering of the plies and/or the direction of the fibres. In the deployed configuration, the best possible rigidity is sought, which means the largest and most closed cross section possible, associated with the end of the tape spring being encastré as extensively as possible. In general, tape spring deployment is obtained by the unwinding of the tape spring around a mandrill. During deployment, the tape spring has a rigidity which is downgraded on account of the natural flexibility of the tape spring in the zone of winding thereof. Optimum rigidity is obtained at the end of deployment when the unwinding zone is replaced by a true encastré status. Nevertheless, it is sometimes desirable for the deployable structure to be operational throughout the tape spring deployment phases, namely in a configuration of total or of partial deployment. In the case of a rewindable deployable structure, it is necessary to have the anchorage of the tape spring encastré so as to guarantee rigidity consistent with the requirement. In order to achieve this, use is generally made of a guide ramp equipped with rollers making it possible simultaneously to achieve extraction of the tape spring and adequate encastré status. This solution is compatible with the requirement but presents various problems, namely a risk of unwanted bracing or unwinding of the tape spring if the stored energy of the tape spring is to be used, haphazard kinematics of the end of the tape and a significant volume often incompatible with the volume allocated for storage.

Because the diameter of the tape spring changes throughout deployment, it is necessary to afford numerous additional guides, at the exit of the tape spring, in order to ensure that the deployable structure as a whole functions correctly.

SUMMARY OF THE INVENTION

The invention seeks to alleviate all or some of the aforementioned problems by proposing a retractable deployable structure for a roll-up and deployable flexible structure that has the advantage of not being very bulky, of being simple to produce, of optimizing the volume of the deployable structure when stored under the fairing of a launcher, of allowing controlled orientation of the deployment, good guidance of the tape spring despite the changing diameter thereof and an ability to refurl and allowing the structure rigidity and stability when deployed.

To this end, one subject of the invention is a deployable structure comprising:

a mount comprising a first point and a second point opposite and a third point, a storage reel able to rotate about an axis Z, a tape spring able to switch from a configuration in which it is wound about the axis Z in the storage reel into a configuration in which it is deployed along an axis X substantially perpendicular to the axis Z, the first and second points forming a double support with the tape spring so as to keep the tape spring in the deployed configuration, characterized in that the third point is able to form a simple support with the tape spring, in that the storage reel is able to move with respect to the third point, in that the storage reel is pressed against the third point so as to guide the deployment of the tape spring, and in that the deployable structure comprises a guide lever comprising two ends, a first of the two ends being pivot connected with respect to the mount, a second of the two ends being secured to the centre of the guide reel, an elastic element arranged between the guide lever and the mount, and intended to push the guide lever so as to press the storage reel against the third point.

According to one embodiment, the mount comprises a guide device and a base, the first, second and third points are secured to the guide device, and the guide device is articulated with respect to the base, preferably about the third point and able to rotate about an axis parallel to the axis Z between a closed position and an open position and vice versa.

According to another embodiment, the first of the two ends of the guide lever is pivot connected with respect to the mount, the second of the two ends is secured to the centre of the guide reel, and the elastic element is positioned between the guide lever and the mount and intended to push the guide lever so as to press the storage reel against the third point.

According to another embodiment, the first end of the guide lever is pivot connected with respect to the base, the second end is secured to the centre of the guide reel, and the elastic element is positioned between the guide lever and the base and intended to push the guide lever so as to press the storage reel against the third point.

According to another embodiment, the deployable structure further comprises a cam, for example slotted, positioned on the storage reel and the guide device comprises a follower intended to be guided in such a way as to command the rotation of the guide device during the deployment of the tape.

Advantageously, the deployable structure comprises a retaining system keeping the guide lever and the guide device in the wound configuration and intended to release the guide lever and the guide device simultaneously when the tape spring switches from the wound configuration to the deployed configuration.

Advantageously, the cam comprises a nonreturn element intended to prevent the guide device from rotating towards the closed position.

According to another embodiment, with the tape spring having two ends, a first end of the tape spring is fixed to the storage reel and a second end of the tape spring is fixed to the base.

Advantageously, the structure may further comprise a deployable articulated mast fixed on a platform of a satellite by means of one or more rotational-drive motors.

The invention also relates to a satellite comprising at least one deployable structure.

BRIEF DESCRIPTION OF THE DRAWINGS

The invention will be better understood and further advantages will become apparent from reading the detailed description of one embodiment given by way of example, the description being illustrated by the attached drawings in which:

FIG. 5 is a cross section in a plane perpendicular to the axis Z of the second embodiment of a deployable structure according to the invention, with the tape spring in the deployed configuration, FIG. 6 is a cross section in a plane perpendicular to the axis Z of a third embodiment of a deployable structure according to the invention, with the tape spring in the partially deployed configuration and with one end fixed to the base, FIGS. 7, 8, 9 are cross sections in a plane perpendicular to the axis Z of a fourth embodiment of a deployable structure according to the invention, the tape spring having one end fixed to the base, each of the figures corresponding to a different deployment configuration, and FIG. 10 schematically depicts a satellite comprising at least one deployable structure according to the invention.

For the sake of clarity, the same elements will bear the same references in the various figures.

DETAILED DESCRIPTION

Figure 1A:
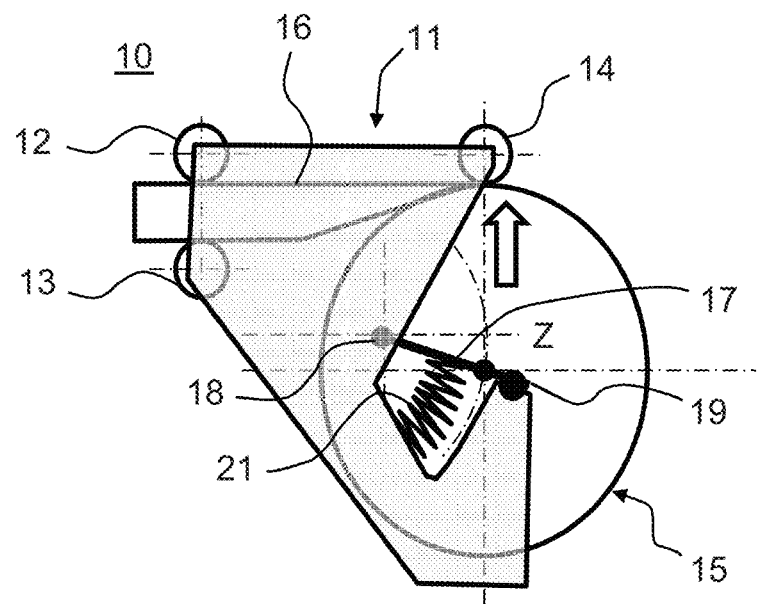
FIGS. 1a and 1b are each a cross section, in a plane perpendicular to an axis Z, the axis of winding of the tape spring, of a first embodiment of a deployable structure according to the invention, the tape spring being respectively in the wound configuration and in the partially unwound configuration.
Figure 1B:
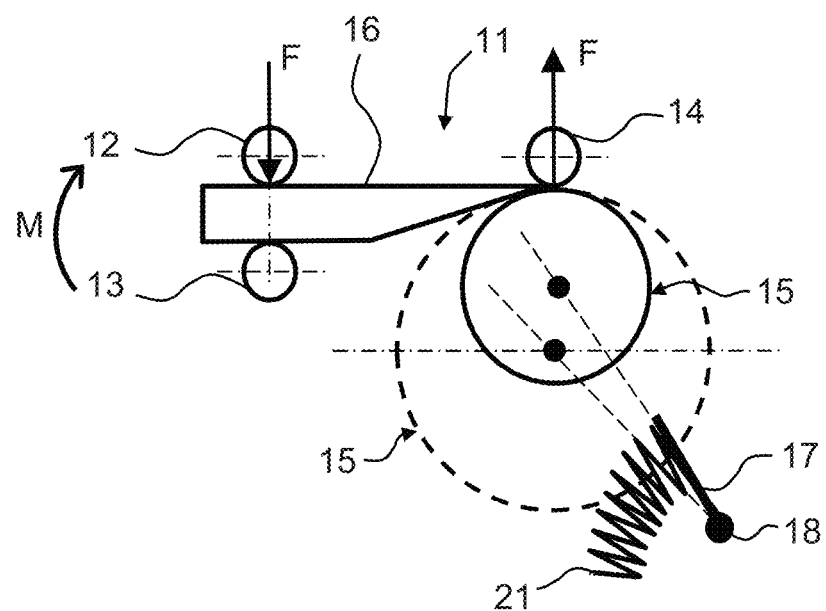

FIGS. 1a and 1b are diagrams of a first embodiment of a deployable structure 10 according to the invention. The deployable structure 10 comprises a mount 11 comprising a first point 12 and a second point 13 opposite and a third point 14. It comprises a storage reel 15 able to rotate about an axis Z and a tape spring 16 able to pass from a wound configuration which is wound about the axis Z in the storage reel 15 to a deployed configuration which is deployed along an axis X substantially perpendicular to the axis Z, the first and second points 12, 13 forming a double support with the tape spring 16 so as to keep the tape spring 16 in the deployed configuration. According to the invention, the third point 14 is able to form a simple support with the tape spring 16, the storage reel 15 is able to move with respect to the third point 14, and the storage reel 15 is pressed against the third point 14 so as to guide the deployment of the tape spring 16.

The three points 12, 13, 14, by forming supports on the tape spring 16, allow controlled orientation of the deployment of the tape spring 16. The points 12 and 13 additionally allow the tape spring 16 to unwind correctly.

The support formed by the point 14 on the tape spring 16 is a point contact but the point 14 can be considered in a broader sense to be a longitudinal support and, that being so, this support may also form a longitudinal contact along an axis substantially perpendicular to the axis X, across the entire width of the tape spring 16 or just part of the width of the tape spring 16. Indeed, without this contact, the tape spring would be able to deploy uncontrollably along any axis. The point 14 allows the deployment of the tape spring to be controlled by virtue of a resistive torque the magnitude of which varies according to the kind of regulation chosen (hybrid or electric). The contact is advantageously positioned near the deployed part of the tape spring 16 so as to allow the tape spring 16 to be encastré and to contribute to the retention of the tape spring 16 in its wound part. The points 12, 13, 14 may consist of a simple support or of a roller so as to limit friction during deployment or refurling phases.

The deployable structure 10 may comprise a guide lever 17 comprising two ends 18, 19, a first of the two ends 18 of the guide lever 17 being pivot connected with respect to the mount 11, a second of the two ends 19 being secured to the centre of the guide reel 15. More specifically, the guide lever 17 is in contact with the mount 11 at its end 18 and is in contact with the storage reel 15 at its end 19 which also forms a contact with the mount 11 when the tape spring is in the wound position, thereby making it possible to prevent the tape spring 16 from unwinding. The deployable structure 10 also comprises an elastic element 21 positioned between the guide lever 17 and the mount 11 and is intended to push the guide lever 17 so as to press the storage reel 15 against the third point 14. The thrust of the elastic element 21 on the guide lever 17 is in a direction that has a component along an axis Y passing through the centres of 14 and 15 and, if possible, substantially perpendicular to the axes X and Z. However, in order more easily to counter the loads applied by the tape spring 16 to the reel 15 in the deployed configuration, the axis 18 may be positioned differently on the mount 11. Its position in the deployed configuration may preferably be substantially parallel to that of the load so that the influence it has on the elastic element 21 is negligible, as depicted in FIG. 1b. In other words, the elastic element 21 pushes the guide lever 17 towards the third point 14. Without departing from the scope of the invention, the guide lever 17 and the elastic element 21 may be replaced by any other element that presses the storage reel 15 against the third point 14.

Because the storage reel 15 is pressed against the third point 14, the simple support formed by the point 14 is always present despite the change in diameter of the tape spring as it deploys, the advantage of this being to guide the deployment of the tape spring 16 in a controlled way.

Figure 2:
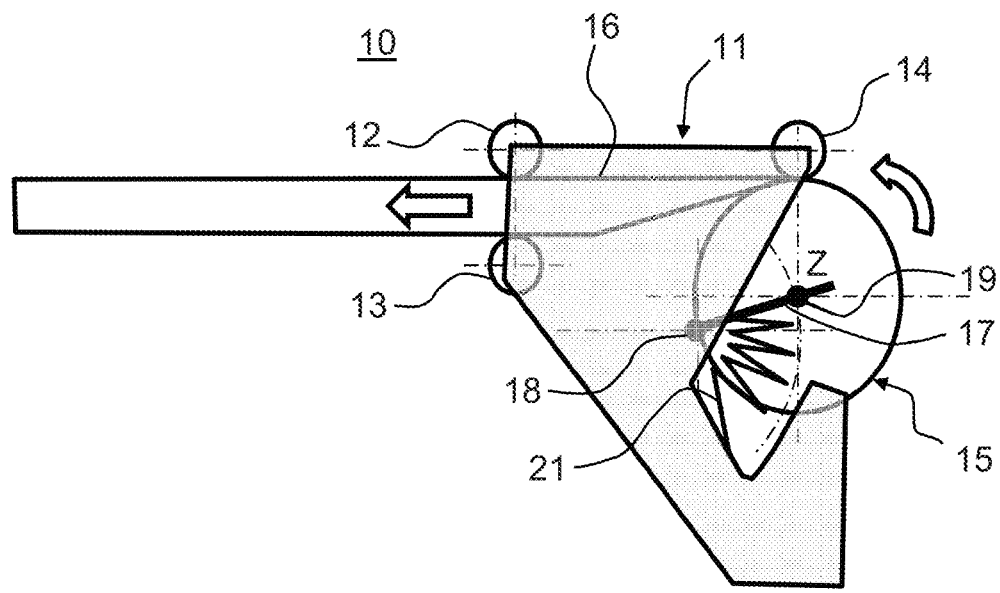
FIG. 2 is a cross section in the plane perpendicular to the axis Z of the first embodiment of the deployable structure according to the invention, with the tape spring in the partially deployed configuration.

FIG. 2 is a cross section in the plane perpendicular to the axis Z of the first embodiment of the deployable structure 10 according to the invention, with the tape spring 16 in the partially deployed configuration. All the elements of FIG. 2 are identical to those of FIG. 1a. To pass from the wound configuration of the deployable structure which is depicted in FIG. 1a to the partially deployed configuration of the structure 10 which is depicted in FIG. 2, the guide lever 17 is first of all detached from the mount 11 at the end 19 by a release system. The storage reel 15 therefore positions itself pressing against the third point 14 under the action of the elastic element 21.

A motor or any other system that regulates the speed of deployment allows control over the deployment of the tape spring 16 about the storage reel 15 leading to the reduction in diameter of the storage reel 15 as the tape spring 16 gradually deploys. Because the end 18 of the guide lever is pivot connected to the mount 11 and the end 19 of the guide lever 17 is equipped to provide rotational guidance of the storage reel 15, the guide lever 17 will push the storage reel 15 towards the third point 14. This thrust is encouraged by the presence of the elastic element 21. As depicted in FIG. 2, the tape spring 16 is in the partially deployed configuration. Its extraction is linear between the first and second points 12, 13. The diameter of the tape spring 16 is therefore smaller than that of the tape spring 16 in the wound configuration. Nevertheless, thanks to the guide lever 17, the storage reel 15 is always kept pressed against the third point 14. It is important for the storage reel to be correctly retained. This is because if it were poorly retained, there could be slippage between the various layers of tape spring 16, and this could cause damage to the solar cells positioned on these layers.

It is also possible, with a view to ensuring good mutual adhesion of the layers, to add an adhesive element to the tape spring 16. The adhesive element may for example be an adhesive tape, a ribbed tape or a strip of hook and loop fastened type.

The three points 12, 13, 14 give the deployable structure 10 an adequate encastré status and therefore ensure correct rigidity of the structure under all configurations of deployment of the tape spring 16, namely in the wound position, in the fully or partially deployed position.

It is possible to dispense with one of the two supports 12 or 13 according to the orientation of the loads or moments at the tip of the tape spring 16.

Figure 3A:
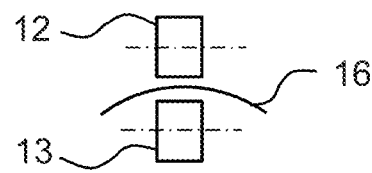
FIGS. 3a, 3b, 3c depict various possible configurations for positioning the supports on the tape spring.
Figure 3B:
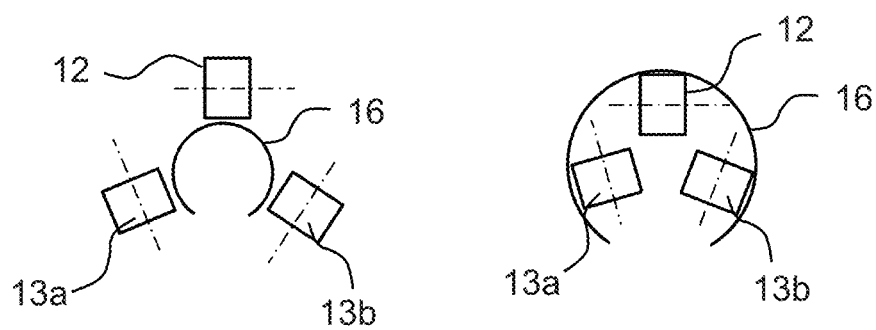
Figure 3C:
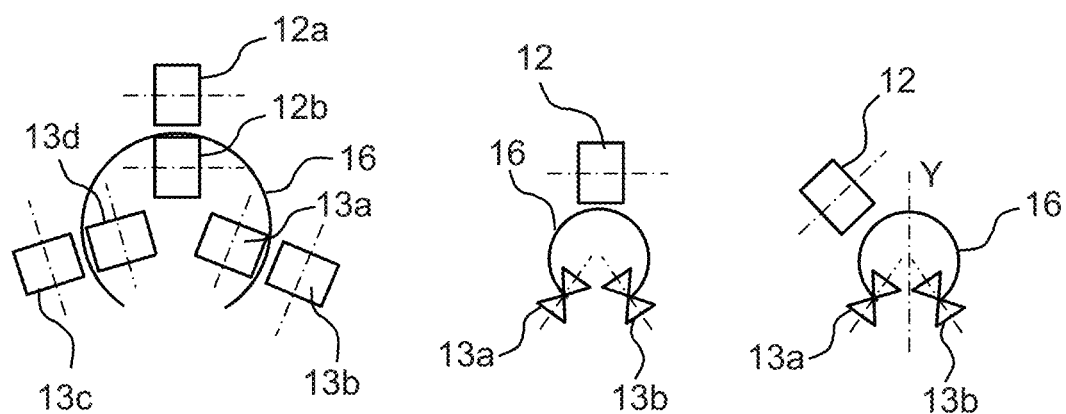

FIGS. 3a, 3b, 3c depict various possible configurations for the positioning of the supports on the tape spring 16. The points 12 and 13 may be opposite one another, as depicted in FIG. 3a, thereby forming a double support on each side of the tape spring 16. The support formed by the point 13, rather than being applied opposite the point 12, may be split into two supports at two points 13a and 13b, still in one and the same plane perpendicular to the axis of deployment of the tape spring 16. The two points 13a and 13b are then positioned at the end on the tape spring 16 in the width thereof. The three points 12, 13a, 13b may press against the outside face or the inside face of the tape spring 16, as depicted in FIG. 3b. Finally, as depicted in FIG. 3c, the points 13a and 13b may be positioned in such a way that each forms a support at the end of the circular arc-shaped cross section. The support 12 may itself be oriented along the axis Y, but may also be offset from the axis Y.

Figure 4:
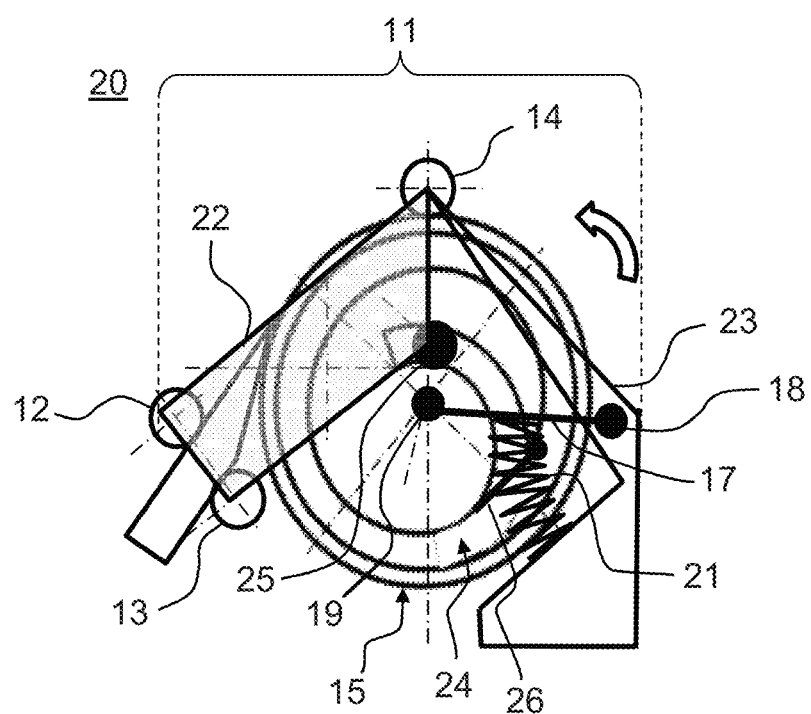
FIG. 4 is a cross section in a plane perpendicular to the axis Z of a second embodiment of a deployable structure according to the invention, with the tape spring in the wound configuration.

FIG. 4 is a cross section in a plane perpendicular to the axis Z of a second embodiment of a deployable structure 20 according to the invention, with the tape spring 16 in the wound configuration. FIG. 5 is a cross section in a plane perpendicular to the axis Z of the second embodiment of the deployable structure 20 according to the invention, with the tape spring in the deployed configuration. All the elements of the deployable structure 20 that is depicted in FIG. 5 are identical to those of the deployable structure 20 that is depicted in FIG. 4.

Just like the deployable structure 10 depicted in FIG. 1a, the deployed structure 20 depicted in FIG. 4 comprises a mount 11 comprising the first point 12 and the second point 13 opposite and the third point 14. It comprises the storage reel 15 able to rotate about the axis Z and the tape spring 16 able to pass from a wound configuration in which it is wound about the axis Z in the storage reel 15 into a deployed configuration in which it is deployed along the axis X, the first and second points 12, 13 forming a double support with the tape spring 16 so as to keep the tape spring 16 in the deployed configuration. The third point 14 is able to form a simple support with the tape spring 16, the storage reel 15 is able to move in relation to the third point 14 and the storage reel 15 is pressed against the third point 14 so as to guide the deployment of the tape spring 16.

In FIG. 4, the mount 11 comprises a guide device 22 and a base 23. The first 12, second 13 and third 14 points are secured to the guide device 22. The guide device 22 is articulated with respect to the base 23, preferably about the third point 14, and able to rotate about an axis parallel to the axis Z between a closed position and an open position and vice versa. The open position of the guide device allows the deployment of the tape spring 16 to be oriented. This configuration means that the deployable structure 20 can have a reduced volume in the stored position. In the stored configuration, the guide device 22 can be stored underneath the storage reel 15.

The deployable structure 20 may further comprise a cam 24 positioned on the storage reel 15. The guide device 22 comprises a roller 25 intended to be guided so as to command the rotation of the guide device 22. For example, the cam 24 may be a slotted cam. In that case, the guide device 22 comprises a roller 25 intended to be housed in the slot so as to command the rotation of the guide device 22 by bearing against the storage reel 15. The deployable structure 20 further comprises a guide lever 17 and an elastic element 21. The first end 18 of the guide lever 17 being pivot connected to the base 23, the second end 19 is secured to the centre of the guide reel 15. The elastic element 21 is positioned between the guide lever 17 and the base 23 and is intended to push the guide lever 17 in such a way as to press the storage reel 15 against the third point 14 as explained previously in respect of the deployable structure 10.

Thus, the deployable structure may be considered to comprise a retaining system 19 for keeping the guide lever 17 and the guide device 22 in the wound configuration and intended to release the guide lever 17 and the guide device 22 simultaneously when the tape spring 16 passes from the wound configuration to the deployed configuration. When there is a desire to pass from the wound configuration (as depicted in FIG. 4) to the deployed configuration (completely or partially as depicted in FIG. 5), the lever 17 and the guide device 22 are simultaneously released using a release mechanism, then the unwinding of the tape spring 16 is triggered using a motor or any other speed-regulating system, the tape spring being self-propelled. In other words, the guide lever 17 is first of all detached from the mount 11 at the end using a release system. The guide reel 15 then positions itself pressing against the third point 14 under the action of the elastic element 21.

The roller 25 housed in the slot moves along the slot following the profile of the slotted cam 24. Because the guide device 22 is articulated about the third point 14, it leaves the stored position as the tape spring 16 gradually deploys. Deployment of the articulated guide device 22 is thus controlled. This configuration makes it possible to give the structure, and notably the tape spring 16, good rigidity throughout the deployment of the tape spring 16 while at the same time limiting the amount of space occupied by the deployable structure 20. The roller 25 has commanded the opening of the guide device 22 which is in the deployed position. The tape spring 16 is likewise in the deployed position.

The cam 24 may comprise a nonreturn element 26 intended to prevent the guide device 22 from rotating towards the closed position. In the example of a slotted cam, the nonreturn element 26 is intended to block the slot so as to prevent the guide device 22 from rotating towards the closed position. In general, the deployable structure 20 is in the stored position only upon launch of the satellite. Once in orbit, the deployable structure 20 is deployed and it is sometimes necessary to partially refurl it. When that happens, complete refurling is not desired and it is therefore not desirable for the guide device 22 to be commanded into its closed position. The nonreturn element 26 blocks the roller 25 in the slot and thus prevents the guide system 22 and, therefore, the deployable structure 20, from returning to the closed position.

The invention is compatible with the use of a simple tape spring and also with the use of a tape spring mounted in opposition. FIG. 6 depicts a cross section in a plane perpendicular to the axis Z of a third embodiment of a deployable structure 40 according to the invention, the tape spring 16 being mounted in opposition and in the partially deployed configuration. All the elements of the deployable structure 40 that is depicted in FIG. 6 are identical to those of the deployable structure 30 that is depicted in FIG. 5, the only difference being that the tape spring 16 is mounted in opposition. The tape spring 16 has two ends 27, 28, a first end 27 of the tape spring 16 is fixed to the storage reel 15 and a second end 28 of the tape spring 16 is fixed to the base 23. This configuration is advantageous: because the tape spring 16 is in direct contact with the base 23, which is itself fixed to the satellite, the energy collected at the solar cells on the tape spring 16 can thus be conveyed directly to the satellite. Without this mounting of the tape spring in opposition, an electric collector is needed to carry the energy from the solar cells to the satellite. Likewise, because the cross sections of the tape spring are in opposition, with the forces or moments on the upper part of the tape spring 16 being oriented in one direction, it is possible to dispense with one of the two supports 12 or 13.

FIGS. 7, 8, 9 are cross sections in a plane perpendicular to the axis Z of a fourth embodiment of a deployable structure 50 according to the invention, the tape spring 16 having one end 28 fixed to the base 23, each of the figures corresponding to a different deployment configuration. All the elements of the deployable structure 50 that is depicted in FIGS. 7, 8, 9 are identical to those of the deployable structure 40 that is depicted in FIG. 6, the slotted cam here being replaced by direct pressure 44 on the storage reel 15. In FIG. 7, the tape spring 16 and the guide device 22 are in the stored position. The guide lever 17 has its end 19 in contact both with the centre of the storage reel 15 and the guide device 22. In FIG. 8, the deployable structure 50 is in the partially deployed configuration. The end 19 of the guide lever 17 has been detached, thus releasing the guide device 22 and allowing the elastic element 21 to push the storage roller 15 towards the third point 14. As the tape spring 16 gradually unwinds, the guide device 22 deploys. As it unwinds, the diameter of the tape spring 16 decreases. Conversely, during a phase of partial winding, the tape spring 16 diameter increases. Despite its change in diameter, the tape spring 16 is kept constantly pressed against the third point 14, contributing to very good stability and very good encastré stiffness regardless of the length of tape spring deployed and even if the tape spring 16 is not locked in its encastré end position, namely fully deployed. Another major advantage lies in the compactness of the deployable structure in a stored position because the space devoted to deployable structures under the fairing of a launcher is limited. Finally, the deployable structures described in the context of the invention are simple to assemble and easy to use.

The invention can be applied to hybrid tape springs consisting of a driving first structure (for example made of carbon fibre) which allows the tape spring to deploy and of a regulating part (thermoelastic or made of a material having viscoelastic properties which limits the rate of deployment under the effect of the internal strain in the material or of a material that has a transformation temperature markedly below that of the main tape) which encourages or limits deployment according to the temperature applied to it. By using a natural phenomenon whereby the viscosity of a material changes with temperature, good reliability and repeatability of deployment regulation are guaranteed.

It may be noted that, in the case where hybrid tape springs are used, refurling is impossible using the force of the tape spring alone because the tape spring drives only in the direction of deployment. To allow the tape spring to be refurled, an electric geared motor unit needs to be added to it. As a result, if single-shot deployment is desired it is possible to have hybrid or electric regulation and/or drive. If multiple deployments of the tape spring are to be envisaged, the regulation and/or drive will then need to be electrical. Further, heating in the region of the supports 12, 13 and 14 may be provided for example.

Figure 10:
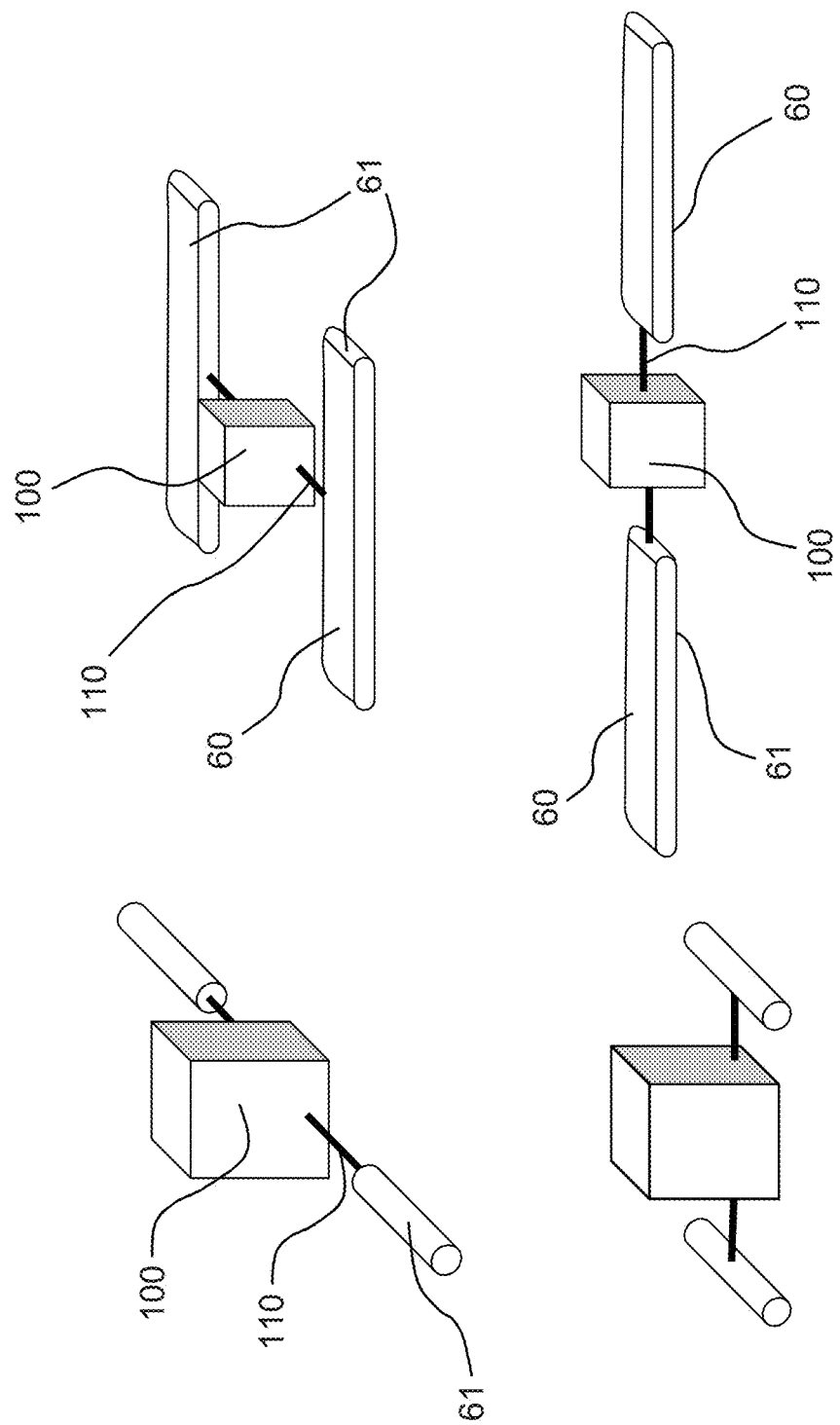

FIG. 10 depicts a satellite 100 comprising at least one deployment device 61 equipped with a flexible membrane 60 and with at least two deployable structures according to the invention. The deployable structure 61 further comprises a deployable articulated mast 110 fixed to a platform of the satellite 100 by, for example, one or more rotational-drive motors. In FIG. 10, the flexible membrane 60 is fully deployed. The satellite 100 comprises a second flexible membrane 60. The two deployment devices 61 are positioned one on each side of the satellite 100. The deployment device 61 may be positioned in the shape of a T in relation to the satellite 100 (the configuration depicted at the top of FIG. 10), which means to say that its longitudinal main direction is perpendicular to the articulated mast 110. The deployment device may equally be positioned in an I shape (the configuration depicted in the bottom of FIG. 10) in relation to the satellite 100, which means to say that its longitudinal main direction is in the continuation of the articulated mast 110.

In general, in actual use, the deployable structure according to the invention is used for just one single deployment. Nevertheless, further mission requirements may arise. Notably, a satellite may need to be transferred or towed from a low orbit to a high orbit. Upon docking, in order to steer the transfer vehicle, the inertia is required to be as low as possible, which means that the presence of large-sized deployable structures is undesirable. It is also necessary to avoid any interference with the satellites that are to be docked. As a result, it is preferable to roll up the deployable structures. When the satellite is hooked up, the structure can be deployed again.

The invention claimed is:

1. A deployable structure comprising:
a mount comprising a first point and a second point opposite and a third point,
a storage reel able to rotate about an axis Z,
a tape spring able to switch from a configuration in which it is wound about the axis Z in the storage reel into a configuration in which it is deployed along an axis X substantially perpendicular to the axis Z, the first and second points forming a double support with the tape spring so as to keep the tape spring in the deployed configuration, wherein the third point is able to form a simple support with the tape spring, wherein the storage reel is able to move with respect to the third point, wherein the storage reel is pressed against the third point so as to guide the deployment of the tape spring, and wherein the deployable structure comprises
a guide lever comprising two ends, a first of the two ends being pivot connected with respect to the mount, a second of the two ends being secured to the centre of the guide reel,
an elastic element arranged between the guide lever and the mount, and intended to push the guide lever so as to press the storage reel against the third point.

2. The deployable structure according to claim 1, wherein the mount comprises a guide device and a base, wherein the first, second and third points are secured to the guide device, and wherein the guide device is articulated with respect to the base and able to rotate about an axis parallel to the axis Z between a closed position and an open position and vice versa.

3. The deployable structure according to claim 2, wherein
the first end of the guide lever is pivot connected with respect to the base, the second end is secured to the centre of the guide reel, and wherein
the elastic element is positioned between the guide lever and the base and intended to push the guide lever so as to press the storage reel against the third point.

4. The deployable structure according to claim 3, comprising a retaining system keeping the guide lever and the guide device in the wound configuration and to release the guide lever and the guide device simultaneously when the tape spring switches from the wound configuration to the deployed configuration.

5. The deployable structure according to claim 2, further comprising a cam positioned on the storage reel and wherein the guide device comprises a follower to be guided in such a way as to command the rotation of the guide device.

6. The deployable structure according to claim 5, wherein the cam comprises a nonreturn element to prevent the guide device from rotating towards the closed position.

7. The deployable structure according to claim 1, the tape spring having two ends, wherein a first end of the tape spring is fixed to the storage reel and wherein a second end of the tape spring is fixed to the base.

8. The deployable structure according to claim 1, further comprising a deployable articulated mast fixed on a platform of a satellite by a rotational-drive motor.

9. A satellite, comprising at least one deployable structure according to claim 8.

* * * * *